J. P. Manny,
Mower.
No. 34,762. Patented Mar. 25, 1862.
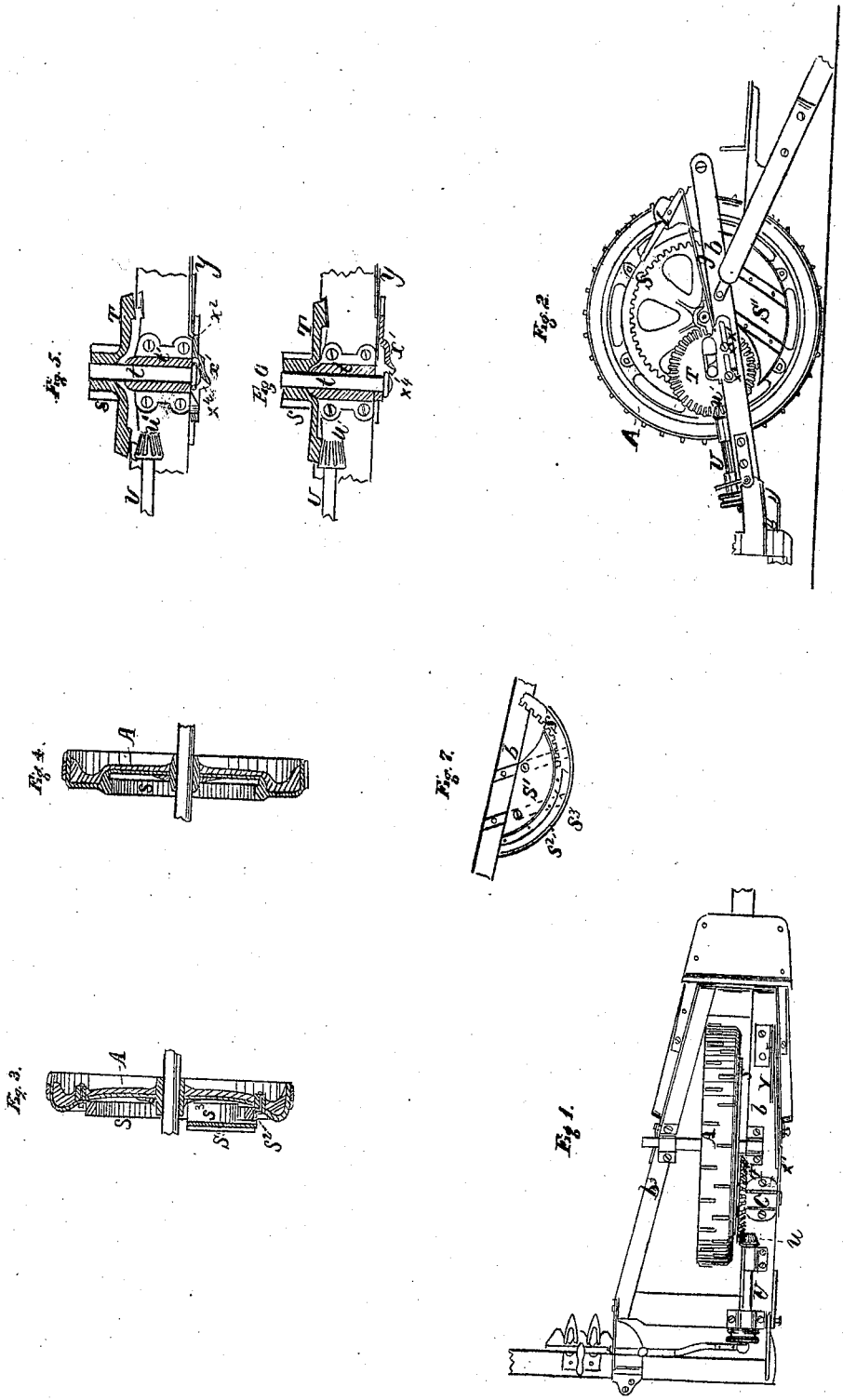

UNITED STATES PATENT OFFICE.

JOHN P. MANNY, OF ROCKFORD, ILLINOIS.

IMPROVEMENT IN HARVESTERS.

Specification forming part of Letters Patent No. 34,762, dated March 25, 1862.

*To all whom it may concern:*

Be it known that I, JOHN P. MANNY, of Rockford, in the county of Winnebago and State of Illinois, have invented certain new and useful Improvements in Gearing for Harvesters, of which the following is a full, clear, and exact description, reference being had to the accompanying drawings, which make part of this specification, and in which—

Figure 1 represents a plan or top view of the gearing-frame of a harvester embracing my improvements detached from the machine. Fig. 2 represents a view in elevation of the outer side of the same. Fig. 3 represents a vertical transverse section through the driving-wheel in the line of its axis. Fig. 4 represents a similar view of a modified form of driving-wheel. Fig. 5 represents a horizontal section through the counter-shaft, journal-box, gearing, and shipping mechanism, showing my improved mode of constructing and arranging those parts, the mechanism being shown as out of gear. Fig. 6 represents a similar view of the same parts with the mechanism in gear; and Fig. 7 represents a view in elevation of the inner side of the gearing-shield and a portion of the cog-wheel it incloses, showing more especially the manner in which the gearing is prevented from becoming clogged.

It is the object of the invention claimed under this patent to introduce into the gearing of a harvester certain novel and useful devices which contribute materially to the proper working of its mechanism; and to this end my improvements consist, first, in combining with the driving-wheel and spur-gear a shield or guard plate, hereinafter described, which completely covers the exposed portions of the gear-wheel, in order to protect the mechanism; secondly, in connecting and disconnecting the driving-gear by moving the counter-shaft endwise in its bearings by means of a sliding plate and inclined planes, hereinafter more fully described.

The accompanying drawings represent a convenient construction and arrangement of parts for carrying out the objects of my invention.

In this instance the driving-wheel A is shown as cast in one piece, and as rounded and solid near its outer edge, in order to prevent it from taking up mud, dirt, or other substances which would get into and clog the gearing. A depression is formed in the face of the wheel, into which an annular internal spur-gear wheel, S, fits. The gear-wheel may either be cast in one piece with the driving-wheel or be made separately and bolted to the face of the driving-wheel. The details of the construction of the wheel are clearly shown in Figs. 1, 2, and 3 of the drawings.

Fig. 4 represents a modification of the wheel, which in this instance is shown as a solid plate-wheel, the depression in which has a square edge, the internal spur-gear itself forming the edge of the depression and being cast in one piece with the wheel. In order to protect the gearing still more effectually from mud, dirt, and other foreign substances than would be done by a wheel of the above construction, I cover the outer side of the lower part of the gear-wheel S with a shield or guard-plate, S', which is fastened to the gearing-frame and fits closely to the wheel. The shield has a flange, $s^2$, on its lower edge, which projects over the gear-wheel, while a similar flange, $s^3$, protects the inner side of the gear-wheel, which revolves freely between the two flanges. The details of this arrangement are clearly shown in Figs. 2, 3, and 7, which latter represents the shield as seen from its inner side.

The outer beam, $b$, of the gearing-frame in this instance is shown as parallel to the plane of the driving-wheel, and as being larger than the inner beam, $b^3$, which is gradually inclined toward the outer beam from rear to front. The gearing-frame entirely surrounds the driving-wheel. Upon the outer beam, $b$, I mount a long journal-box, $t'$, which carries the counter-shaft $t$. This shaft carries a spur-pinion, $s$, and a bevel-wheel, T, which may, as in this instance, be cast in one piece. The outer face of this bevel-wheel is hollowed out, in order to permit the end of the journal-box to enter it, which arrangement secures a long bearing for the journal, and, by bringing the bearing-surfaces of the bevel-wheel more directly over the end of the counter-shaft, diminishes the strain upon it and its consequent liability to twist or spring. The details of this arrangement are clearly shown in Figs. 5 and 6 of the drawings.

The crank-shaft U is mounted in bearings in the outer beam, $b$, and lies parallel to the plane of the driving-wheel. A bevel-pinion, $u'$, which gears into the bevel-wheel T, is mounted upon one end of the crank-shaft, while the other carries the crank or wrist-pin $u$ to which the pitman V, which drives the cutters, is attached.

In order to connect and disconnect the gearing, I make the countershaft $t$ somewhat longer, than its bearing or journal-box $t'$, and so that it shall be free to slide endwise therein. Upon the outer end of the counter-shaft I form a flange or collar, which fits into a slot in a sliding yoke or plate, $x'$, which moves horizontally upon pins $x^2$ in the gearing-frame, which pins take into slots $x^3$ on the plate. The movements of this plate are controlled by a rod, $y$, leading to a lever, Y, pivoted to the gearing-frame and controlled by the foot of the driver, as shown in Fig. 2 of the drawings. An inclined plane, $x^4$, is formed upon the forward end of the sliding plate, and is of such shape that when pushed backward it throws the bevel-wheel T out of gear with the pinion on the crank-shaft U, and thus stops the cutters, and when drawn forward it throws the wheel and pinion into gear again. The details of the construction, arrangement, and operation of this device will be clearly understood by a reference to Figs. 5 and 6 of the drawings, in the former of which figures the gearing is shown as disconnected; in the latter as connected.

What I claim under this patent as my invention, and desire to secure by Letters Patent, is—

1. The combination of the driving-wheel A and gear-wheel S with the shield or guard-plate S', constructed and arranged as and for the purposes described.

2. The combination of the counter-shaft $t$ with the sliding plate $x'$, constructed, arranged, and operating as described, for the purpose of throwing the mechanism into or out of gear.

In testimony whereof I have hereunto subscribed my name.

JOHN P. MANNY.

Witnesses:
WM. D. BALDWIN,
JOHN S. HOLLINGSHEAD.